(12) United States Patent
Tabata et al.

(10) Patent No.: US 6,344,899 B1
(45) Date of Patent: Feb. 5, 2002

(54) INK JET RECORDING APPARATUS

(75) Inventors: Shinji Tabata; Hidetoshi Kawashima, both of Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/137,753

(22) Filed: Aug. 21, 1998

(30) Foreign Application Priority Data

Sep. 1, 1997 (JP) .............................................. 9-236019

(51) Int. Cl.$^7$ ............................................... B41B 13/08
(52) U.S. Cl. .......................... 358/1.1; 358/1.9; 358/448; 358/502; 358/518
(58) Field of Search .......................... 358/1.9, 1.1, 518, 358/521, 519, 502, 448, 445, 456, 458, 459, 527

(56) References Cited

FOREIGN PATENT DOCUMENTS

| JP | A-55-79162 | 6/1980 | ............... B41J/3/04 |
|---|---|---|---|
| JP | A-60-153669 | 8/1985 | ............. H04N/1/23 |
| JP | A-61-108254 | 5/1986 | ............. H04N/1/23 |
| JP | A-3-5161 | 1/1991 | ............... B41J/2/21 |
| JP | A-4-361049 | 12/1992 | ............. B41J/2/205 |
| JP | A-5-38818 | 2/1993 | ............... B41J/3/04 |
| JP | A-7-323536 | 12/1995 | ............... B41J/2/01 |
| JP | B2-2608262 | 2/1997 | ............... B41J/2/21 |

*Primary Examiner*—David Moore
*Assistant Examiner*—K. Kianni
(74) *Attorney, Agent, or Firm*—Oliff & Berridge

(57) ABSTRACT

In an ink amount limiting section 4, there are obtained ink amount limiting coefficients which are used to limit the ink amounts of the respective colors in such a manner that, where the maximum number of times of repeated printing with respect to a unit pixel that can prevent the ink from being blurred and from soaking up to the back surface of the record medium is set for a given value, the maximum number of times of ordinarily repeated printing within the unit pixel can provide a limited repeated printing conversion number equal to or less than the above-set given value. And, based on the thus obtained ink amount limiting coefficients and the image signals of the respective colors output from the γ correcting section 3, print signals are generated and output. The print signals are quantized into the number of times of repeated printing in the halftoning section 5 according to a multi-level error diffusion method, and the thus quantized print signals are dot printed repeatedly in the printing section 6 to thereby form an image. In the print signals that are output from the ink amount limiting section 4, since the number of times of repeating ink drops is limited to the given value or less, the number of times of repeated dot printing by the printing section 6 is substantially equal to or less than the given number of times, thereby being able to reduce the possibility that the ink can be blurred and can soak up to the back surface of the record medium.

11 Claims, 13 Drawing Sheets

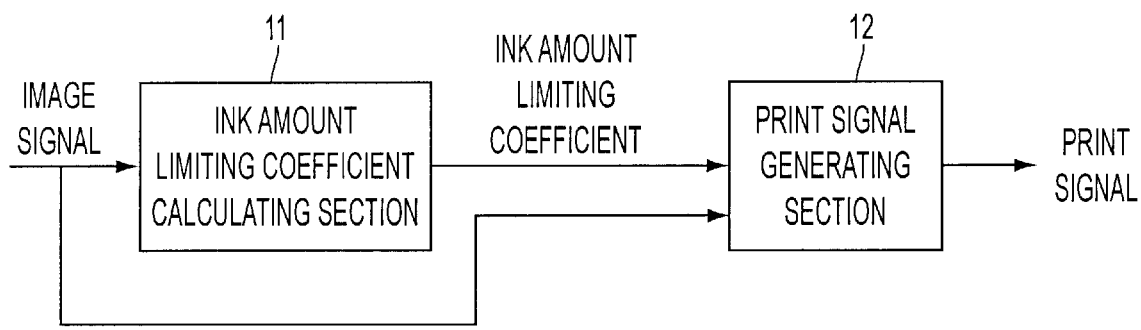
FIG. 2
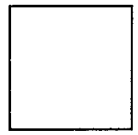
FIG. 3A  =  NO-PRINTING
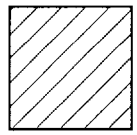  =    ONCE-PRINTING
FIG. 3B
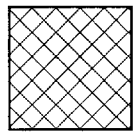  =    TWICE-PRINTING
FIG. 3C
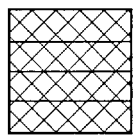  =  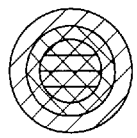  THRICE-PRINTING
FIG. 3D

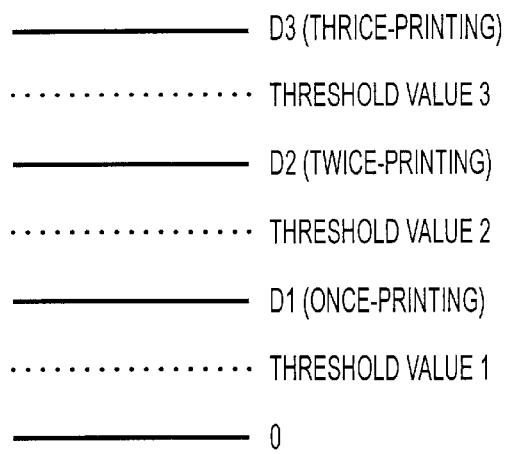
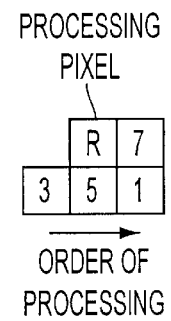
FIG. 4A   FIG. 4B
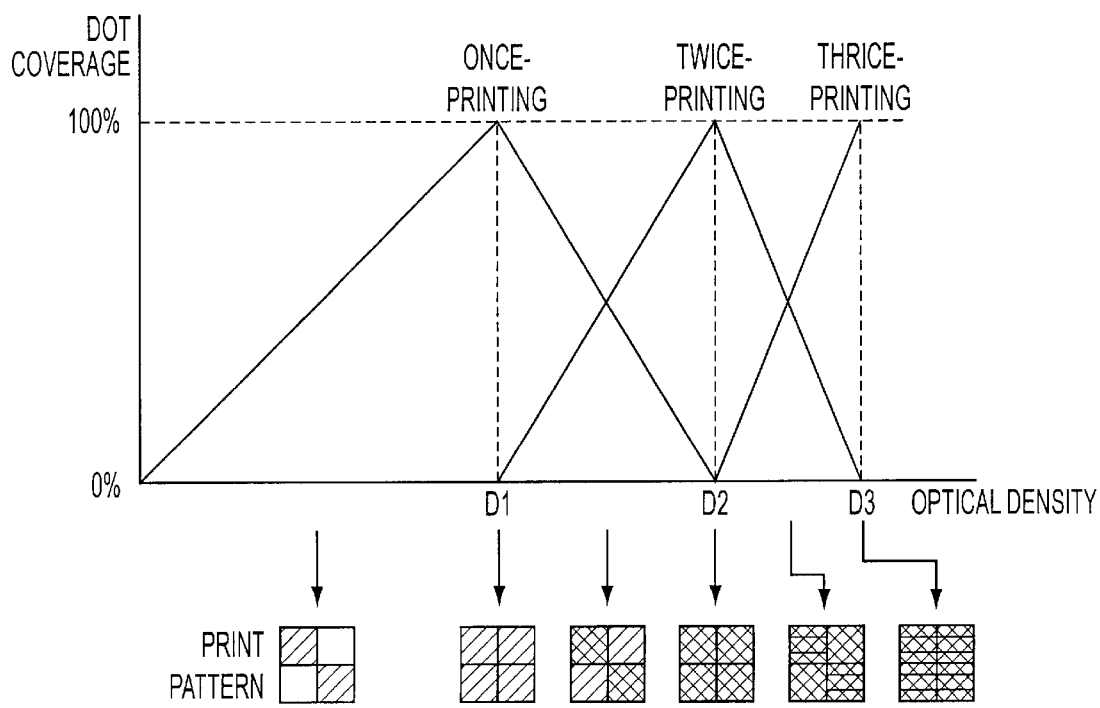
FIG. 5

| | MAXIMUM NUMBER OF TIMES OF REPEATED PRINTING | INPUT SIGNAL | | |
|---|---|---|---|---|
| | | ONCE-PRINTING | TWICE-PRINTING | THRICE-PRINTING |
| BLACK | 1 | 255 (100%) | | |
| CYAN | 3 | 127 (50%) | 204 (80%) | 255 (100%) |
| MAGENTA | 3 | 127 (50%) | 204 (80%) | 255 (100%) |
| YELLOW | 1 | 255 (100%) | | |

| PRINTED COLOR | | MAXIMUM NUMBER OF TIMES OF REPEATED PRINTING | LIMITED REPEATED PRINTING CONVERSION NUMBER |
|---|---|---|---|
| 1 PRIMARY COLOR | BLACK | 1 | 1 |
| | CYAN | 3 | 3 |
| | MAGENTA | 3 | 3 |
| | YELLOW | 1 | 1 |
| 2 SECONDARY COLOR | BLACK + CYAN | 4 | 3 |
| | BLACK + MAGENTA | 4 | 3 |
| | BLACK + YELLOW | 2 | 2 |
| | CYAN + MAGENTA | 6 | 3.5 |
| | CYAN + YELLOW | 4 | 3 |
| | MAGENTA + YELLOW | 4 | 3 |
| 3 CUBIC COLOR | BLACK + CYAN + MAGENTA | 7 | 3.75 |
| | BLACK + CYAN + YELLOW | 5 | 3.25 |
| | BLACK + MAGENTA + YELLOW | 5 | 3.25 |
| | CYAN + MAGENTA + YELLOW | 7 | 3.75 |
| 4 QUARTIC COLOR | BLACK + CYAN + MAGENTA + YELLOW | 8 | 4 |

FIG. 8

| OPTICAL DENSITY (INPUT SIGNAL) d | REPEATED PRINTING CONVERSION NUMBER | | | |
| --- | --- | --- | --- | --- |
| | BLACK $f_B(d)$ | CYAN $f_C(d)$ | MAGENTA $f_M(d)$ | YELLOW $f_Y(d)$ |
| 0% | 0 | 0 | 0 | 0 |
| 5% | 0.05 | 0.1 | 0.1 | 0.05 |
| 10% | 0.1 | 0.2 | 0.2 | 0.1 |
| 15% | 0.15 | 0.3 | 0.3 | 0.15 |
| 20% | 0.2 | 0.4 | 0.4 | 0.2 |
| 25% | 0.25 | 0.5 | 0.5 | 0.25 |
| 30% | 0.3 | 0.6 | 0.6 | 0.3 |
| 35% | 0.35 | 0.7 | 0.7 | 0.35 |
| 40% | 0.4 | 0.8 | 0.8 | 0.4 |
| 45% | 0.45 | 0.9 | 0.9 | 0.45 |
| 50% | 0.5 | 1 | 1 | 0.5 |
| 55% | 0.55 | 1.17 | 1.17 | 0.55 |
| 60% | 0.6 | 1.33 | 1.33 | 0.6 |
| 65% | 0.65 | 1.5 | 1.5 | 0.65 |
| 70% | 0.7 | 1.67 | 1.67 | 0.7 |
| 75% | 0.75 | 1.83 | 1.83 | 0.75 |
| 80% | 0.8 | 2 | 2 | 0.8 |
| 85% | 0.85 | 2.25 | 2.25 | 0.85 |
| 90% | 0.9 | 2.5 | 2.5 | 0.9 |
| 95% | 0.95 | 2.75 | 2.75 | 0.95 |
| 100% | 1 | 3 | 3 | 1 |

| | | MAXIMUM NUMBER OF TIMES OF REPEATED PRINTING | | LIMITED REPEATED PRINTING CONVERSION NUMBER | INK AMOUNT LIMITING COEFFICIENT | |
|---|---|---|---|---|---|---|
| 2 SECONDARY COLOR | ADDITION VALUE | | | 3 | | |
| | BLACK | 4 | → | 0.83 | KC_K | 0.83 |
| | CYAN | 3 | → | 2.15 | KC_K | 0.83 |
| | ADDITION VALUE | | | 3 | | |
| | BLACK | 4 | → | 0.83 | KM_K | 0.83 |
| | MAGENTA | 3 | → | 2.15 | KM_M | 0.83 |
| | ADDITION VALUE | | | 2 | | |
| | BLACK | 2 | → | 1 | KY_K | 1.00 |
| | YELLOW | 1 | → | 1 | KY_Y | 1.00 |
| | ADDITION VALUE | | | 3.5 | | |
| | CYAN | 6 | → | 1.73 | CM_C | 0.72 |
| | MAGENTA | 3 | → | 1.73 | CM_M | 0.72 |
| | ADDITION VALUE | | | 3 | | |
| | CYAN | 4 | → | 2.15 | CY_C | 0.83 |
| | YELLOW | 3 | → | 0.83 | CY_Y | 0.83 |
| | ADDITION VALUE | | | 3 | | |
| | MAGENTA | 4 | → | 2.15 | MY_M | 0.83 |
| | YELLOW | 3 | → | 0.83 | MY_Y | 0.83 |

FIG. 11

| | | MAXIMUM NUMBER OF TIMES OF REPEATED PRINTING | | LIMITED REPEATED PRINTING CONVERSION NUMBER | INK AMOUNT LIMITING COEFFICIENT | |
|---|---|---|---|---|---|---|
| 3 CUBIC COLOR | ADDITION VALUE | 7 | → | 3.75 | | |
| | BLACK | 1 | → | 0.66 | KCM_K | 0.66 |
| | CYAN | 3 | → | 1.53 | KCM_C | 0.66 |
| | MAGENTA | 3 | → | 1.53 | KCM_M | 0.66 |
| | ADDITION VALUE | 5 | → | 3.25 | | |
| | BLACK | 1 | → | 0.73 | KCY_K | 0.73 |
| | CYAN | 3 | → | 1.77 | KCY_C | 0.73 |
| | YELLOW | 1 | → | 0.73 | KCY_Y | 0.73 |
| | ADDITION VALUE | 5 | → | 3.25 | | |
| | BLACK | 1 | → | 0.73 | KMY_K | 0.73 |
| | MAGENTA | 3 | → | 1.77 | KMY_M | 0.73 |
| | YELLOW | 1 | → | 0.73 | KMY_Y | 0.73 |
| | ADDITION VALUE | 7 | → | 3.75 | | |
| | CYAN | 3 | → | 1.53 | CMY_C | 0.66 |
| | MAGENTA | 3 | → | 1.53 | CMY_M | 0.66 |
| | YELLOW | 1 | → | 0.66 | CMY_Y | 0.66 |
| 4 QUARTIC COLOR | ADDITION VALUE | 8 | → | 4 | | |
| | BLACK | 1 | → | 0.61 | KCMY_K | 0.61 |
| | CYAN | 3 | → | 1.37 | KCMY_C | 0.61 |
| | MAGENTA | 3 | → | 1.37 | KCMY_M | 0.61 |
| | YELLOW | 1 | → | 0.61 | KCMY_Y | 0.61 |

INK JET RECORDING APPARATUS

BACKGROUND OF THE INVENTION

The present invention relates to an ink jet recording apparatus which, in accordance with an image signal input therein, generates a print signal in such a manner that a plurality of color inks are dot printed repeatedly at a unit pixel, and records gradations by the respective colors, thereby recording a color image.

Conventionally, as an ink jet recording apparatus capable of gradation recording, as disclosed in the Unexamined Japanese Patent Application Publication Nos. Sho 55-79162, Hei 4-361049, Hei 7-323536 and the like, there is known an ink jet recording apparatus of a type in which, a plurality of ink dots are applied or printed at the same position on a record medium. However, in the high optical density portion of the printing, since ink dots are printed many times repeatedly, the amount of ink on the record medium is large. Therefore, unless there is used a record medium having a large ink holding capacity, the ink can be blurred or can soak into the back surface of the record medium. In these citations, there is shown a case in which only one kind of color ink is used. However, for example, when carrying out a color print, two to four colors inks are applied to the same position: that is, in the color print, the above-mentioned problem relating to the blurred ink and soaked ink becomes more serious.

In order to improve the above problems, for example, as disclosed in the Unexamined Japanese Patent Application Publication No. Sho 60-153669, there is proposed a system in which, after ink dots are forcibly dried, other ink drops are applied repeatedly at the same position. However, in this system, the forced drying requires a heater or the like, which increases the cost of the system.

Also, as another gradation recording system, for example, as disclosed in the Unexamined Japanese Patent Application Publication Nos. Sho 61-108254, Hei 3-5161, Hei 5-38818, and the like, there is known a system in which gradations are expressed using at least two kinds of, that is, dense and light inks for the same color. According to this method, in the high optical density portion, instead of printing by applying the ink dots repeatedly onto the same position on a record medium, the dense ink is substituted for the light ink for printing, which can reduce the amount of ink applied onto the record medium over the previously described conventional system: that is, there hardly arises the problem that the ink can be blurred or can soak to the back surface of the record medium. However, use of this system increases the kinds of inks used, which makes it difficult to reduce the cost of the ink jet recording apparatus using this system.

SUMMARY OF THE INVENTION

The present invention aims at eliminating the above-mentioned problems found in the conventional ink jet recording apparatus. Accordingly, it is an object of the invention to provide an ink jet recording apparatus which, when printing a high optical density portion of a color image or applying a large number of inks at the same position, can reduce the possibility that the ink can be blurred and ink can soak to the back surface of the record medium.

When printing an image signal, one or more colors are used according to the image signal. For every color used, ink dots are printed repeatedly by the number that corresponds to the number of times of repeated printing, thereby printing the image signal or a color image. Normally, there is decided the maximum number of times of repeated printing that is the number of dots when printing a color image at a maximum optical density. In the normal printing, in order to print a color image at a maximum optical density, dots, which are equal in number to the addition value or sum of the maximum numbers of times of repeated printing by colors used, are printed repeatedly at a unit pixel. In this case, as previously described, there is the possibility that the ink can be blurred and can soak to the back surface of the record medium. In view of this, according to the invention, the maximum dot number that can prevent the occurrence of such blurred and soaked ink is set as a given value; that is, the maximum numbers of times of repeated printing for the respective color are limited so that the addition value or sum of the maximum numbers of times of repeated printing for the respective colors used can provide a limited repeated printing conversion number equal to or less than the given value. In this case, ink amount limiting coefficients, which are coefficient for limiting the ink amounts of the respective colors, are calculated using ink amount limiting coefficient calculating means. And, in accordance with the image signal and ink amount limiting coefficients, a print signal is generated by a print signal generating means. Due to this, the print signal is limited to the limited repeated printing conversion number even when the number of times of repeated printing for each color is set largest, thereby being able to reduce the possibility that the ink can be blurred and can soak to the back surface of the record medium.

When finding the ink amount limiting coefficient by use of the ink amount limiting coefficient calculating means, the ink amount limiting coefficient can be calculated in accordance with the sum of the numbers of times of repeated printing for the respective colors when the image signal is printed as it is; that is, for example, when the added value or sum of the number of times of repeated printing for the respective colors is equal to or less than the limited repeated printing conversion number, the ink amount limiting coefficient can be used as a value which has no influence in the above-mentioned print signal generating means; or, the added value of the number of times of repeated printing for the respective colors is weighted so that the added value of the maximum numbers of times of repeated printing provides the limited repeated printing conversion number, thereby being able to find the above-mentioned ink amount limiting coefficient from which the weighted numbers of times of repeated printing can be obtained.

Also, the print signal generating means is able to multiply the components of each of the colors of the image signal by the ink amount limiting coefficients for the respective colors to thereby generate a print signal; and, the portions of the color components of the image signal which are common to two or more of the color components of the image signal can be multiplied by the above-mentioned ink amount limiting coefficients corresponding to the common portions to thereby generate a print signal, whereas the other or excess portions thereof not common can be added together as they are to thereby generate a print signal.

Further, such limitation of the ink amount can be executed selectively according to printing modes. Also, a print signal to be output can be halftone processed before it is printed. Further, there can also be employed a structure that the variations in the colors caused by the processing by the image signal generating means can be previously corrected by color correcting means.

BRIEF DESCRIPTION OF THE DRAWINGS

FIG. 2 is a block diagram of an example of an ink amount limiting section included in the above system structure;

FIGS. 3A to 3D are explanatory view of a gradation recording method using a repeated ink printing technique in the above embodiment of an ink jet recording apparatus according to the invention;

FIGS. 4A and 4B are explanatory view of a multi-level error diffusion method;

FIG. 5 is a graphical representation of the relation between the optical density and the dot coverage in each number of times of repeated dot printing according to the error diffusion method;

FIG. 8 is an explanatory view of an example of the relation between the maximum numbers of times of repeated printing in all combinations of inks to be printed and the maximum repeated printing conversion numbers obtained when an ink limiting processing is executed;

FIG. 9 is an explanatory view of an example of the relation between the optical densities (input signals) of the respective colors and the repeated print conversion numbers;

FIG. 10 is an explanatory view of an example of the limited repeated printing conversion numbers of the respective colors and ink amount limiting coefficients in a secondary color case;

FIG. 11 is an explanatory view of an example of the limited repeated printing conversion numbers of the respective colors and ink amount limiting coefficients in cubic and quartic color cases;

DETAILED DESCRIPTION OF THE PREFERRED EMBODIMENTS

Figure 1:
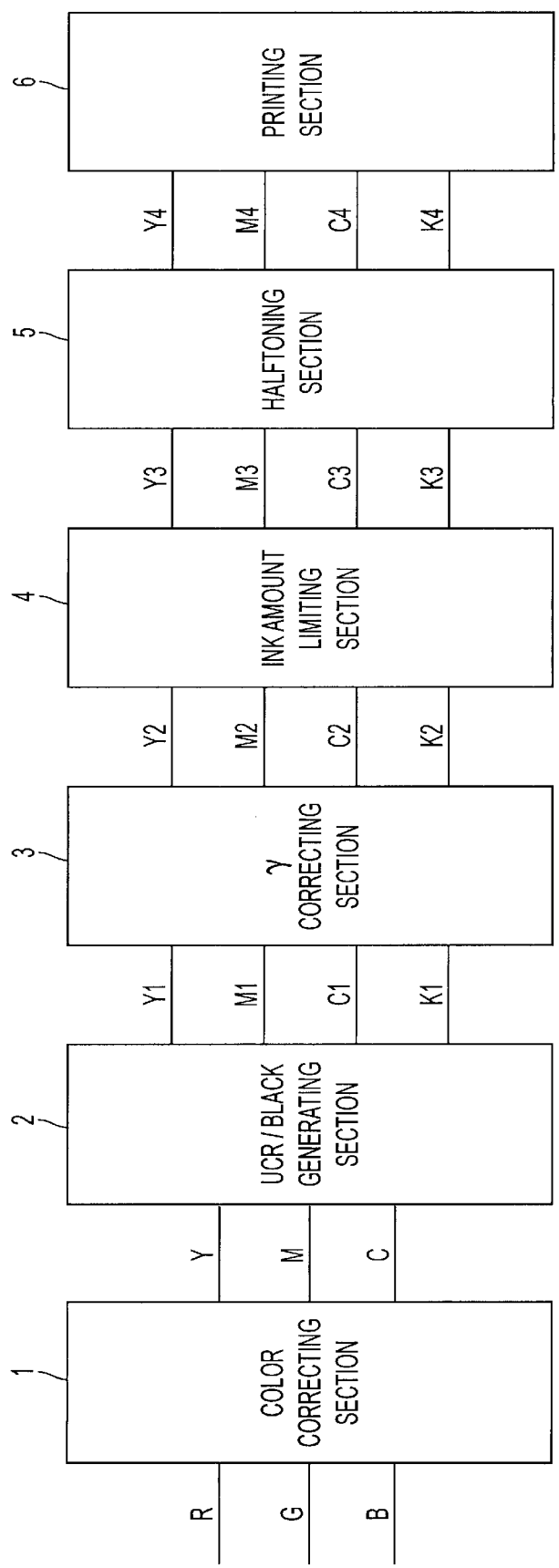
FIG. 1 is a block diagram of an example of a system structure including therein an embodiment of an ink jet recording apparatus according to the invention.

Now, FIG. 1 is a block diagram of an example of a system structure including therein an embodiment of an ink jet recording apparatus according to the invention. In FIG. 1, reference character 1 designates a color correcting section, 2 a UCR/Black generating section, 3 a γ correcting section, 4 an ink amount limiting section, 5 a halftoning section, and 6 a printing section, respectively.

In particular, the color correcting section 1 converts input R, G and B signals into Y, M and C signals which respectively correspond to ink colors to be used in printing. In this color converting operation, the color correcting section 1 also corrects the variations of the colors which are caused in a processing to be executed by the ink amount limiting section 4. By the way, when the input signals are other signals than the R, G and B signals, the color correcting section 1 may be structured in such a manner that it performs a color converting processing according to such input signals. Also, when the input signals are the Y, M and C signals, the color correcting section 1 may be structured in such a manner that it performs only the color correcting processing. Now, the UCR/Black generating section 2 not only executes an undercolor removing processing but also generates a black signal from the Y, M and C signals and then outputs Y1, M1, C1 and K1 signals. The γ correcting section 3 makes a γ correction according to the characteristics of the printing section 6 and then outputs Y2, M2, C2 and K2 signals. The ink amount limiting section 4 carries out an ink amount limiting processing for limiting the number of dots to be printed repeatedly (which will be discussed later) and then outputs Y3, M3, C3 and K3 signals. By the way, the ink amount limiting section 4 can be structured such that the operation thereof can be selected according to printing modes. Now, the halftoning section 5 converts the Y3, M3, C3 and K3 signals according to, for example, an error diffusion method, a dither method or the like into Y4, M4, C4 and K4 signals which can be printed in the printing section 6. The respective color signals Y4, M4, C4 and K4 can consist of signals which respectively indicate the number of times of repeatedly printing their respective color inks on a unit pixel. And, the printing section 6 prints an image signal according to an ink jet system, and, in particular, prints color ink dots repeatedly based on the Y4, M4, C4 and K4 signals to thereby print a color image.

The respective processings of the above-mentioned color correcting section 1, UCR/Black generating section 2, γ correcting section 3, ink amount limiting section 4, a halftoning section 5, and printing section 6 can be composed of a look-up table (LUT). Also, these processings may be in part or wholly collected together to thereby create an LUT and, after then, the LUT may be executed.

Now, FIG. 2 is a block diagram of an example of the ink amount limiting section 4. In FIG. 2, reference character 11 designates an ink amount limiting coefficient calculating portion, while 12 stands for a print signal generating portion 12. Here, the Y2, M2, C2 and K2 signals, which are respectively image signals to be input, as well as the Y3, M3, C3 and K3 signals, which are respectively print signals to be output, are shown by a single line. The ink amount limiting coefficient calculating portion 11, when there is a possibility that the color inks can be blurred and can soak up to the back surface of the record medium when the colors to be expressed by the image signals are printed at the maximum density, calculates, based on the image signals, the number of times of repeatedly printing the color inks at a unit pixel, that is, the ink amount limiting coefficients for limiting the ink amounts of the respective color inks. As described above, normally, for every color, the maximum number of times of repeated printing, which is the number of times of repeated ink printing when printing the image signals at the maximum density, is decided. Since ink colors to be used can be found from the image signal, if the maximum numbers of times of repeated printing of the colors used are added together, then there can be obtained the number of times of repeated printing at a unit pixel. If the number of times of repeated printing at a unit pixel exceeds a given number of times, then the ink can be blurred and can soak up to the back surface of the record medium. For this reason, if the added value or sum of the numbers of times of the maximum repeated printing is limited to the range of such given number of times, then there can be reduced the possibility that the ink can be blurred and can soak up to the back surface of the record medium. Accordingly, there is calculated an ink amount limiting coefficient which is a coefficient used to limit the then maximum number of times of repeated printing within the range of a given number of times.

And, the print signal generating portion 12 generates a print signal based on the image signal and the ink amount limiting coefficient obtained in the ink amount limiting coefficient calculating portion 11. Since the print signal is a signal which is defined such that the number of times of repeated printing at a unit pixel is limited to or less than a given number of times, when printing is executed using the present print signal, a total of the numbers of the dots of all ink colors to be applied to a unit pixel is equal to or less than the given number of times. Due to this, there can be reduced the possibility that the ink can be blurred and can soak up to the back surface of the record medium.

Now, description will be given below of a first embodiment of the operation of the above embodiment of an ink jet recording apparatus according to the invention, using the concrete examples thereof. At first, a gradation recording method will be described. Here, not only the repeated printing at a unit pixel but also the expression of gradation according to the error diffusion method are employed.

Now, FIGS. 3A to 3D are explanatory view of a gradation recording method using the repeated ink printing technique in the above embodiment of an ink jet recording apparatus according to the invention. Here, there is shown a case in which the ink dots are printed repeatedly up to three times, while four kinds of gradations can be printed per dot. That is, there are available a no-printing case, a once-printing case, a twice-printing case, and a thrice-printing case. And, the number of times of repeated printing to be used depends on the colors and characteristics of inks to be used. For example, for yellow and black, there are used dense inks and thus once-printing can provide sufficient densities. On the other hand, for cyan and magenta, there can be used low-density or light inks, so that, if they are printed repeatedly two or more times, then the densities thereof can be caused to vary. In view of this, in the following cases, it is assumed that only the once-printing is used for yellow and black, whereas cyan and magenta can be repeatedly printed up to three times.

However, simple use of such repeated ink printing can express only four gradations for cyan and magenta as well as only two gradations for yellow and black. To achieve full-color printing, such small number of gradations are not sufficient but it is necessary to express the intermediate or medium gradations of these gradations. For this purpose, there are used the error diffusion method for halftone processing. Generally, in a binary halftone processing, the dot coverage is caused to vary according to the density thereof. In particular, such processing is applied to a multi-level error diffusion method. On the other hand, because the error diffusion method has been already introduced in many literatures, the detailed description thereof is omitted here.

Now, FIGS. 4A and 4B are explanatory view of a multi-level error diffusion method. For example, let us assume that a dot is printed up to three times. It is also assumed that an optical density obtained when all dots are printed once is expressed as D1, an optical density obtained when all dots are printed twice is expressed as D2, and an optical density obtained when all dots are printed three times is expressed as D3. As shown in FIG. 4A, threshold values 1, 2 and 3 are respectively set in accordance with these densities. By comparing the pixel values of each unit pixel with the threshold values 1 to 3, not to print, to print once, to print twice, or to print three times is decided.

For example, when to print twice is decided, there is produced an error with respect to the pixel value of the relevant unit pixel. The error, as shown in FIG. 4B, is distributed to neighboring pixels (here, peripheral pixels whose pixel values are decided thereafter). For example, $7/16$ of the error is distributed to the neighboring pixel on the right. When deciding the pixel value of the neighboring pixel on the right, the pixel value of the relevant pixel is compared with the threshold value based on the sum of error values distributed from the peripheral pixels to thereby decide the number of times of repeated printing.

In this manner, the number of times of repeated printing in each unit pixel is decided. For example, in an image having an optical density near the threshold value 2, if a twice-printing operation is executed in a certain pixel, then a negative error value is distributed to its neighboring pixels so that, for example, in the adjoining pixels, a once-printing operation is executed. In this operation, a positive error is produced and is distributed to the neighboring pixels. In this manner, there is printed an image in which twice-printed ink dots and once-printed ink dots are mixed. The optical density of an image printed, generally, provides an optical density almost near the threshold value 2 existing in the middle of the twice-printed dot density and the once-printed dot density. Such generation of the medium gradation image according to the error diffusion method is executed in the halftoning section 5.

Now, FIG. 5 is a graphical representation of the relation between the optical density and the dot coverage in every number of times of repeated dot printing according to the error diffusion method. If printing is executed according to the above-mentioned four-level error diffusion method, then an optical density obtained when all dots are printed once provides D1, an optical density obtained when all dots are printed twice provides D2, and an optical density obtained when all dots are printed three times provides D3. An optical density ranging from 0 to D1 can be expressed by variations in the once-printed dot coverage. As the optical density increases from 0, there increases the coverage of dots which are printed by the once-printing operation, while the optical density of the threshold 1 is printed as if the once-printed dots covered half of the whole area. And, at the time of the density D1, the once-printed dot coverage reaches 100%, that is, all the printed positions are filled with the once-printed dots.

Also, in the optical densities ranging from D1 to D2, the once-printed dots and the twice-printed dots are intermingled; and, as the optical density changes from the density D1 toward the density D2, the once-printed dots are gradually changed to the twice-printed dots. For this reason, the coverage of the once-printed dots decreases, whereas the coverage of the twice-printed dots increases. In other words, when the input signal has the optical density D1, all dots are covered by the once-printed dots; however, the higher than the density D1 the optical density becomes, the more often the repeated printing is executed on the once-printed dots, with the result that the coverage of the once-printed dots decreases, whereas the coverage of the twice-printed dots increases. At the then time, the number of no-printing dots and the number of thrice-printing dots are both 0. That is, at the optical density of the threshold 2 existing in the middle of the two densities D1 and D2, the once-printed dots cover 50%, while the twice-printed dots cover 50%.

Similarly, in the range of the optical densities from D2 to D3, the twice-printed dots and thrice-printed dots may be intermingled and twice-printed dots may be gradually changed to the thrice-printed dots. At the optical density of the threshold 3 existing in the middle of the two densities D2 and D3, the twice-printed dots cover 50%, while the thrice-printed dots cover 50%. And, if the thrice-printed dots cover 100%, then the optical density reaches the maximum density.

Figures 6, 7:
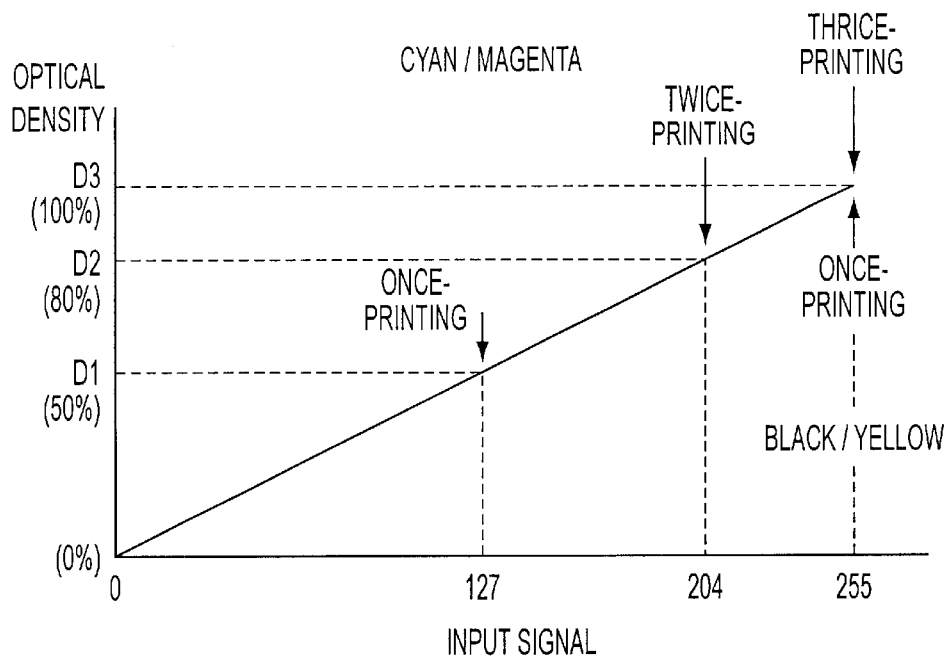
FIG. 6 is a graphical representation of an example of the relation between the input signal and optical density.
FIG. 7 is an explanatory view of the relation among the maximum number of times of repeated printing of the respective colors, the input signals of the respective colors, and the number of times of repeated printing of the respective colors.

Now, FIG. 6 is a graphical representation of an example of the relation between the input signal and the optical density. The threshold values shown in FIG. 4A according to the error diffusion method are decided in such a manner that the relation between the input signal and optical density can be made as linear as possible. Here, as an example, it is assumed that the input signal is an 8-bit signal. The input signal can take values ranging from 0 to 255. Referring to the optical density, for the purpose of explanation, the maximum expressible density is assumed to be 100%, while the density is expressed by the percentage ranging from 0 to 100%.

As can be seen from the graphical representation shown in FIG. 6, when the input signal is 0, the density corresponds to 0%; when the input signal is 127, the density corresponds to 50%; and, when the input signal is 255, the density corresponds to 100%. As described above, in cyan and magenta, when the maximum optical density is expressed by the thrice-printing, all dots are printed by the thrice-printing operation for the input signal of 255 (density 100%), by the twice-printing operation for the input signal of 204 (density 80%), and by the once-printing operation for the input signal of 127 (density 50%). On the other hand, in black and yellow, when the input signal is 255 (density 100%), all printing positions are printed by the once-printing operation. In FIG. 6, description has been given of the case in which the relation between the input signal and optical density is made linear. However, this is not limitative but, for example, there can be used a graph in which the optical densities 0~D1, D1~D2, and D2~100% (D3) can be respectively made to be approximate to a straight line, or there can be used a graph which shows a certain function relation. Also, in the above-mentioned case, there has been shown the relation between the input signal and optical density. However, this is not limitative but, instead of the optical density, a lightness L* or a color difference δ E can also be used.

Now, FIG. 7 is an explanatory view of the relation among the maximum number of times of repeated printing of the respective colors, the input signals of the respective colors, and the number of times of repeated printing of the respective colors. The above-mentioned concrete example can be summarized as shown in FIG. 7. That is, in black, since it is printed only by the once-printing operation, the maximum number of times of repeated printing thereof is 1 and, when the input signal is 255 (density 100%), all dots are printed by the once-printing operation. On the other hand, in cyan, dots are printed by three kinds of printing operations: that is, when the input signal is 127 (density 50%), all dots are printed by the once-printing operation; when the input signal is 204 (density 80%), all dots are printed by the twice-printing operation; and, when the input signal is 255 (density 100%), all dots are printed by the thrice-printing operation. In magenta, dots are printed similarly to cyan. Also, in yellow, dots are processed similarly to black.

Now, FIG. 8 is an explanatory view of an example of the relation between the maximum numbers of times of repeated printing in all combinations of inks to be printed and the maximum repeated printing conversion numbers obtained when an ink limiting processing is executed. When black, cyan, magenta and yellow are respectively used as a single color, as shown in FIG. 7 as well, the maximum numbers of times of repeated printing are respectively 1, 3, 3 and 1.

In a secondary color in which two of the above-mentioned four colors are combined or printed repeatedly one on top of the other, in order to express the maximum optical density thereof, for the respective colors, ink dots are printed repeatedly by the number of times corresponding to the maximum number of times of repeated printing and, for this reason, the repeated printing is executed by the number equal to the addition value or sum of the maximum numbers of times of repeated printing of the respective colors. For example, when black and cyan are superimposed on top of each other, printing is executed four times which corresponds to the sum of 1 (which is the maximum number of times of repeated printing of black) and 3 (which is the maximum number of times of repeated printing of cyan). Also, in the secondary colors, when cyan and magenta are used, the maximum number of times of repeated printing becomes the greatest, that is, the maximum number of times of repeated printing is 6.

In a cubic color in which three of the four colors are superimposed on top of another, the repeated printing is executed by the number equal to the addition value or sum of the maximum numbers of times of repeated printing of the respective three colors used. For example, when cyan, magenta and black are superimposed on top of another, printing is executed seven times corresponding to the sum of 3 (which is the maximum number of times of repeated printing of cyan), 3 (which is the maximum number of times of repeated printing of magenta), and 1 (which is the maximum number of times of repeated printing of black). In the cubic colors, this maximum number of times of repeated printing provides the maximum value. Similarly, in a quartic color in which all the four colors are used, the maximum number of times of repeated printing is 8.

When printing the image on coat paper exclusively used for an ink jet recording apparatus or on plain paper, if four or more ink drops are printed repeatedly or superimposedly at the same position, then the ink cannot be absorbed sufficiently but can be spread and blurred or the ink can soak up to the back surface of the paper to appear on the paper back surface. In order to avoid such blurred ink or such back surface appearance of the ink, the ink amount limiting processing may be executed in such a manner that the maximum number of times of repeated printing can be controlled not to exceed four times. Here, when the maximum number of times of repeated printing is three times or less, no ink amount limiting processing is executed but the original ink amount can be used; and, when the maximum number of times of repeated printing is four times to eight times, the ink amount limiting processing is executed in such a manner that the maximum number of times of repeated printing can be three times to four times. In particular, the ink amount is limited so that the maximum number can be reduced from 8 times to 4 times, 7 times to 3.75 times, 6 times to 3.5 times, 5 times to 3.25 times, and 4 times to 3 times, respectively. Here, although the maximum number of times of repeated printing is originally an integer value, decimals are used for the following calculations, and the maximum number of times of repeated printing when the ink amount is limited is herein referred to as a limited repeated printing conversion number. By the way, the limited repeated printing conversion numbers obtained when the ink amount is limited are shown in the right-most column of FIG. 8.

With use of such conversion numbers, not only the optical densities in which all dots are printed once, twice and three times can be expressed in the form of conversion numbers, but also optical densities existing between them can be expressed in the form of the repeated print conversion numbers. Now, FIG. 9 is an explanatory view of an example of the relation between the optical densities of the respective colors and the repeated print conversion numbers. As can be seen from FIGS. 6 and 7, for black and yellow, at the density of 100%, all dots are printed once and, therefore, the repeated print conversion number at the then time is 1. Also, for cyan and magenta, at the density of 100%, the repeated print conversion number is 3, at the density of 80%, the repeated print conversion number is 2, and, at the density of 50%, the repeated print conversion number is 1. If other optical densities than the above can be interpolated linearly based on the above, then their respective repeated print conversion numbers can be found, as shown in FIG. 9. By the way, in FIG. 9, the repeated print conversion numbers are shown for every 5%.

Here, the relation between the input signals and the repeated print conversion numbers of the respective colors is assumed as a function. As shown in FIG. 6, there is found a correspondence between the optical density and input signal and, therefore, in FIG. 9, an optical density corresponding to the input signal is expressed as d. Then, the repeated print conversion numbers of the respective colors are assumed to be the functions of the density d, that is, they are expressed as $f_B(d)$, $f_C(d)$, $f_M(d)$, and $f_Y(d)$, respectively.

Next, description will be given below of how to limit the ink amounts of the respective colors when the ink amounts are limited to thereby convert the addition values or sum of the maximum numbers of times of repeated printing of the respective colors to the limited repeated printing conversion numbers. Here, FIGS. 10 and 11 are respectively explanatory views of an example of the limited repeated printing conversion numbers of the respective colors and ink amount limiting coefficients. In particular, description will be given here of a secondary color case using black and cyan. In this case, as shown in FIG. 8, the addition value or sum of the maximum numbers of times of repeated printing is 4, while the limited repeated printing conversion number obtained when the ink amounts are limited is 3. The numbers of times of repeated printing of black and cyan are limited so that the maximum number of times of repeated printing of the present secondary color can be reduced from four times down to three times. If the above-mentioned repeated printing conversion numbers are used, then the maximum numbers of times of repeated printing of black and cyan can be expressed as $f_B(100)$ and $f_C(100)$, respectively: that is, $f_B(100)+f_C(100)=4$. The sum of the respective repeated printing conversion numbers may be the limited repeated printing conversion number. Here, using a coefficient KC__K and a coefficient KC__C, there can be found $f_B(100\times KC\_K)+f_C(100\times KC\_C)\approx3$. In this case, the coefficients KC__K and KC__C respectively provide ink amount limiting coefficients. Therefore, the ink amount limiting coefficients KC__K and KC__C can be found.

By the way, referring to the symbol of the ink amount limiting coefficient, the symbol in front of '__' means a color to be used, while the symbol in the rear of '__' means a color showing the rate thereof. In the above-mentioned example, KC__K stands for the coefficient of black in the secondary color using black (K) and cyan (C). Similarly, KC__C stands for the coefficient of cyan.

In finding the ink amount limiting coefficient, there can be used the repeated printing conversion numbers shown in FIG. 9. That is, the sum of the repeated printing conversion numbers of colors used may be approximate to the limited repeated printing conversion number. Although there are present innumerable ink amount limiting coefficients which satisfy this condition, here, from the viewpoint of holding the color balance as much as possible, the ink amounts of the respective colors are limited at the same rate. In this case, in the table of the repeated printing conversion numbers shown in FIG. 9, the sum of the repeated printing conversion numbers in the same column for colors used may be approximate to the limited repeated printing conversion number. For example, in a case in which black and cyan are used, from FIG. 9, at the density of 80%, 0.8+2=2.8; and, at the density of 85%, 0.85+2.25=3.1. Although, in FIG. 9, the limited repeated printing conversion numbers are shown only at intervals of every 5%, almost at the density of 83%, the addition value or the sum is approximate to 3. That is, $f_B(83)+f_C(83)\approx3$. Accordingly, the ink amount limiting coefficients for limiting the ink amounts of the respective colors at the same rate provide KC__K=KC__C=0.83. At the then time, the limited repeated printing conversion numbers of black and cyan respectively provide $f_B(100\times KC\_K)=0.83$ and $f_C(100\times KC\_C)=2.15$. In FIGS. 10 and 11, the limited repeated printing conversion numbers are shown by arrows on the right of the maximum number of times of repeated printing, while the ink amount limiting coefficients are shown in the right-most column.

Now, let us consider a cubic color case similarly. In particular, in a cubic color case in which an input signal uses three colors, that is, black, cyan and magenta, since the addition value or sum of the maximum numbers of times of repeated printing of these colors provides 7 times, the ink amounts of these three colors are limited so that this the original number of times, that is, 7 times can be limited to 3.75 times which is the limited repeated printing conversion number of the present cubic color. In order to be able to achieve such limitation, there is obtained the ink amount limiting coefficients KCM__K, KCM__C and KCM__M which can provide $f_B(100\times KCM\_K)+f_C(100\times KCM\_C)+f_M(100\times KCM\_M)\approx3.75$. In this case as well, assuming that black, cyan and magenta are limited at the same rate, KCM_K=KCM_C=KCM_M=0.66 can be obtained. Also, the maximum repeated printing conversion number of black provides $f_B(100 \times KCM\_K)=0.66$, while the maximum repeated printing conversion numbers of cyan and magenta respectively provide $f_C(100 \times KCM\_C)=f_M(100 \times KCM\_M)=1.53$.

The ink amount limiting coefficient calculating portion 11 of the ink amount limiting section 4 discriminates a color or colors (that is, one to four of black, cyan, magenta and yellow) to be used from an image signal input therein and, for example, as shown in FIGS. 10 and 11, can obtain an ink amount limiting coefficient from the color(s) to be used. In this example, since the ink amount limiting coefficient is fixed by the color(s) to be used, among the tables shown in FIGS. 10 and 11, the set(s) of the color(s) to be used and associated ink amount limiting coefficients may be held. The thus obtained ink amount limiting coefficient is transmitted to the print signal generating portion 12.

By the way, in FIGS. 10 and 11, the ink amount limiting coefficients of the primary colors are not set forth. In the primary colors, the maximum number of times of repeated printing is 3 or less and, therefore, the ink amounts thereof are not limited. In this case, the ink amount limiting coefficient is set as 1.00. Similarly, for example, in a secondary color using black and yellow, the maximum number of times of repeated printing thereof is 2 and no ink amount limiting processing is executed and, therefore, the then ink amount limiting coefficient is also set as 1.00.

Figure 12:
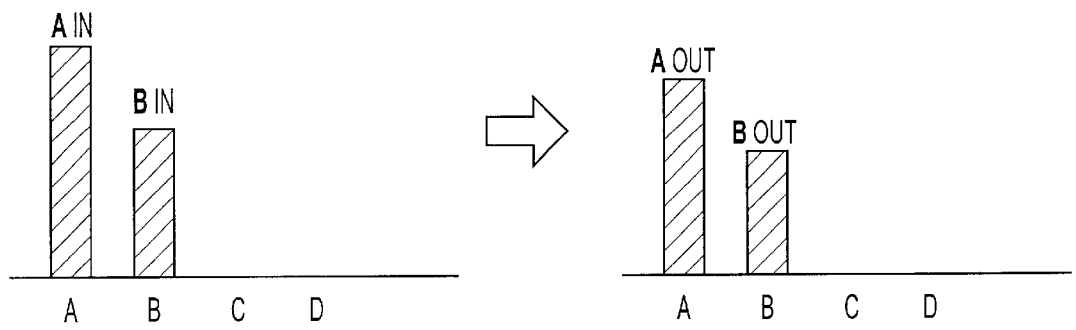
FIG. 12 is an explanatory views of an example of an operation to be executed for a secondary color by a print signal generating portion in the first example of the operation of the above embodiment of an ink jet recording apparatus according to the invention.
Figure 13:
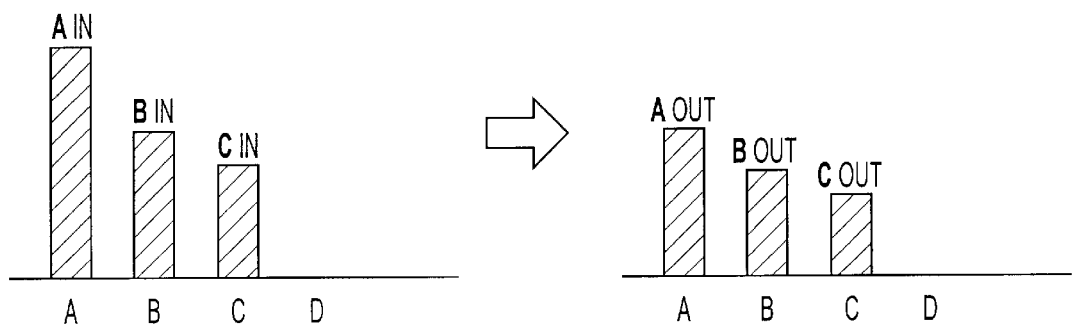
FIG. 13 is an explanatory views of an example of an operation to be executed for a cubic color by the print signal generating portion in the first example of the operation of the above embodiment of an ink jet recording apparatus according to the invention.

Now, FIGS. 12 and 13 are respectively explanatory views of an example of the operation of the print signal generating portion 12 in the first example of the operation of the above embodiment of an ink jet recording apparatus according to the invention. In more particular, FIG. 12 shows a secondary color case, while FIG. 13 shows a cubic color case. By the way, in the following operation example, for the purpose of generalization, the input signals are expressed as "A", "B", "C", and "D"; however, they also may be respectively expressed by any one of the above-mentioned colors, that is, black, cyan, magenta and yellow. Also, in FIGS. 12 and 13, Ain, Bin, and Cin respectively designate image signals to be input, whereas Aout, Bout, and Cout respectively designate print signals to be output.

If the ink amount limiting coefficient is input therein from the ink amount limiting coefficient calculating portion 11 in the above-mentioned manner, then the print signal generating portion 12 multiplies the input image signal by the ink amount limiting coefficient to thereby generate a print signal. That is, in the secondary color, in FIG. 12, Aout=Ain×AB_A, and Bout=Bin×AB_B, where the ink amount limiting coefficient is AB_A=AB_B. For example, when it is judged that the input image signal is a secondary color consisting of black and cyan, in FIG. 12, it is assumed that "A"→"K" corresponds to "B"→"C". In particular, when there are input image signals which respectively correspond to d1=100, and d2=65, they are respectively converted to Kout=Kin'KC_K and Cout=Cin×KC_C, that is, 83=100×0.83 and 54=65×0.83. Here, KC_K=KC_C is a value which is calculated in the ink amount limiting coefficient calculating portion 11, that is, from FIG. 10, it is 0.83.

Similarly, in a cubic color case, in FIG. 13, there are found the following equations:

*Aout=Ain×ABC_A,*

*Bout=Bin×ABC_B,*

*Cout=Cin×ABC_C,* where the ink amount limiting coefficient is ABC_A=ABC_B=ABC_C. For example, when it is judged that the input image signal is a cubic color consisting of black, cyan and magenta, in FIG. 13, it is assumed that "A"→"K", "B"→"C", and "C"→"M" correspond to one another. For example, when there are input image signals which respectively correspond to d1=100, d2=65, and d3=50, their respective input signals are converted to Kout=Kin×KCM_K, Cout=Cin×KCM_C, and Mout=Min×KCM_M, that is, 66=100×0.66, 43=65×0.66, and 33=50×0.66. Here, KCM_K=KCM_C=KCM_M is a value which is calculated in the ink amount limiting coefficient calculating portion 11, that is, from FIG. 11, it is 0.66.

In the foregoing description, while two sets of color combination one for the secondary and one for cubic colors have been illustrated, this can also apply to other cases similarly. That is, not only in other sets of color combination, but also in a quartic color, there can be obtained print signals in which the ink amounts are limited similarly to the illustrated examples.

If the halftoning section 5 expresses the medium gradations according to, for example, the error diffusion method using the print signals with the ink amounts thereof limited in the above-mentioned manner, then even in the color which, unless the ink amount thereof is not limited, requires up to 7 times of repeated dot printing, the printing thereof can be completed within almost 4 times of repeated printing. This makes it possible to obtain an excellent image which is free from the blurred ink or from the soaked ink into the back surface of the record medium.

Now, description will be given below of a second example of the operation of the above embodiment of an ink jet recording apparatus according to the invention. The present second operation example is different mainly in the operation of the print signal generating portion 12 from the previously described first operation example. Here, description will be given of only the portions of the second operation example that are different from those of the previously described first operation example.

Figure 14A:
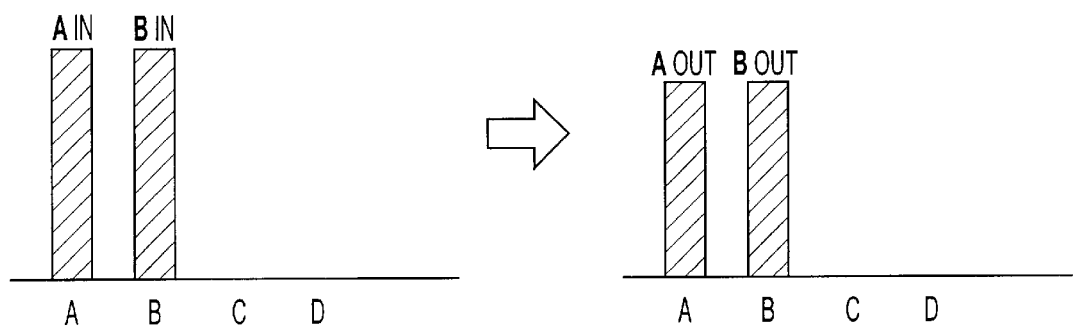
FIGS. 14A and 14B are explanatory view of an example of an operation to be executed for a secondary color by an ink amount limiting section in the second operation example of the above embodiment of an ink jet recording apparatus according to the invention.

Now, FIGS. 14A to 15D are respectively explanatory views of an example of the operation of an ink amount limiting section in the second operation example of the above embodiment of an ink jet recording apparatus according to the invention. In particular, FIGS. 14A and 14B show secondary color case, whereas FIGS. 15A to 15D show a cubic color case. In the previously described first operation example, the ink amount limiting coefficients are uniformly multiplied to thereby generate the print signals. On the other hand, in the second operation example, the common signal levels of the respective input image signals, that is, the portions that are common to all of the input image signals are multiplied by the ink amount limiting coefficients, whereas the portions thereof not common are, as they are, added together, thereby generating print signals. This operation is executed in order to be able to hold the contrast of the resultant printing as clearly as possible.

At first, description will be given below of a secondary color case. When Ain=Bin, as shown in FIG. 14A, similarly to the previously described first operation example, the image signals are multiplied by the ink amount limiting coefficients as they are: that is,

*Aout=Ain×AB_A,*

*Bout=Bin×AB_B.*

Also, for example, when Ain>Bin, up to the portion of Ain that is the same level as Bin is multiplied by the ink amount limiting coefficient, whereas the portion Ain−Bin (in FIGS. 14A and 14B, an outline portion) is added as it is. That is, the operation is executed in the following manner:

$$Aout=(Ain-Bin)+Bin \times AB\_A,$$

$$Bout=Bin \times AB\_B,$$

where, AB__A=AB__B.

In particular, when the image signals input are judged as a secondary color consisting of black and cyan, in FIG. 14, "A"→"K" and "B"→"C" correspond to each other. When Kin=Cin, as shown in FIG. 14A, the respective signals are converted to Kout=Kin×KC__K and Cout=Cin×KC__C. For example, when there are input the image signals that respectively correspond to d1=100 and d2=100, the image signals are respectively converted to 83=100×0.83 and 83=100× 0.83 and are then output as print signals. Here, KC__K= KC__C is a value which is calculated in the ink amount limiting coefficient calculating portion 11; in particular, from FIG. 10, it is 0.83.

Figure 14B:
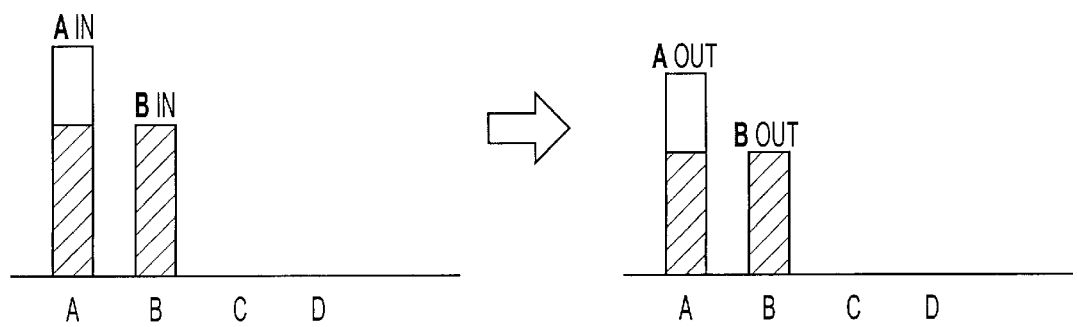

Also, when Kin>Cin, as shown in FIG. 14B, the image signals input are respectively converted to Kout=(Kin− Cin)+Cin×KC__K and Cout=Cin×KC__C. For example, when there are input the image signals that respectively correspond to d2=100 and d2=65, the image signals are respectively converted to 89=(100−65)+65×0.83, and 54=65×0.83. Here, KC__K=KC__C, similarly to the above-mentioned case, is 0.83.

Figure 15A:
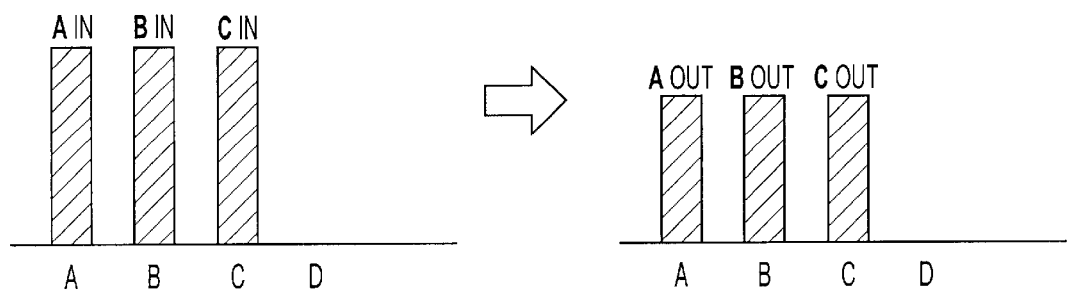
FIGS. 15A to 15D are explanatory view of an example of an operation to be executed for a cubic color by the ink amount limiting section in the second operation example of the above embodiment of an ink jet recording apparatus according to the invention.

When the image signals input are a cubic color, there are available four cases: that is, Ain=Bin=Cin, Ain>Bin=Cin, Ain>Bin>Cin, and Ain=Bin>Cin. By the way, it is assumed that ABC__A=ABC__B=ABC__C. When Ain=Bin=Cin, as shown in FIG. 15A, the image signals are multiplied by the ink amount limiting coefficients as they are to thereby obtain the following output signals: that is, $$Aout=Ain \times ABC\_A,$$

$$Bout=Bin \times ABC\_B,$$

$$Cout=Cin \times ABC\_C.$$

Figure 15B:
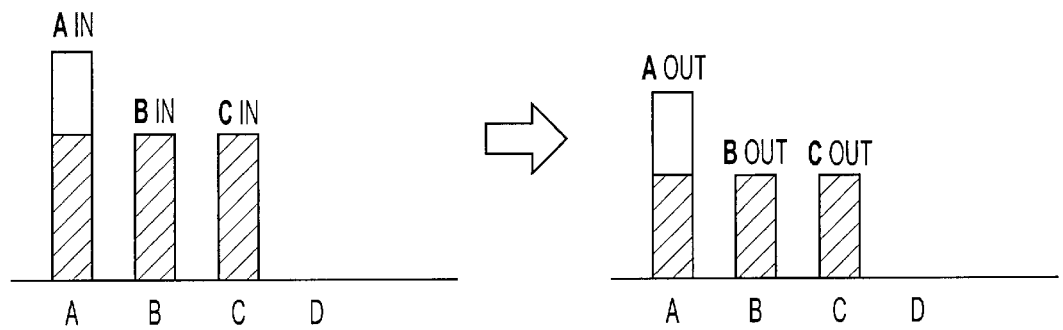

Also, when Ain>Bin=Cin, as shown in FIG. 15B, up to the portion of Ain that is the same level to Bin (Cin) is multiplied by the ink amount limiting coefficient, whereas the portion Ain−Bin (In FIG. 15B, a outline portion) is added as it is. That is, the image signals are converted to the following output signals:

$$Aout=(Ain-Bin)+Bin \times ABC\_A,$$

$$Bout=Bin \times ABC\_B,$$

$$Cout=Cin \times ABC\_C.$$

Figure 15C:
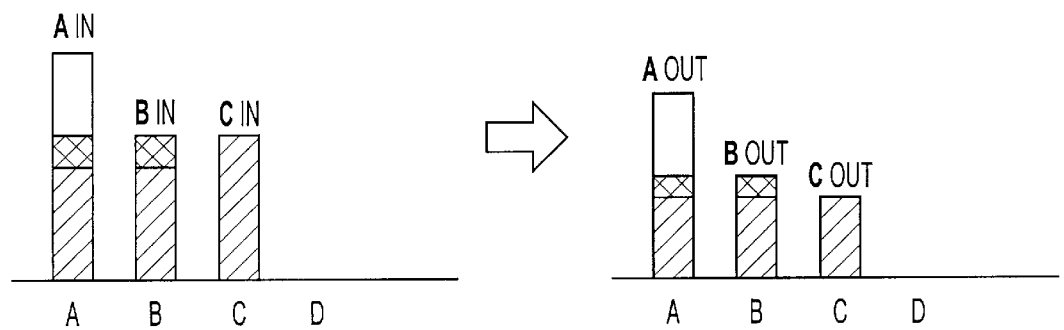

Further, when Ain>Bin>Cin, as shown in FIG. 15C, up to the portions of Ain and Bin that are the same level to Cin are multiplied by the ink amount limiting coefficients of the cubic color. In the Ain−Cin portion and the Bin−Cin portion, the portion of Ain−Cin (in FIG. 15C, a fine hatching portion) that is the same level as the Bin−Cin portion is multiplied by the ink amount limiting coefficient of the secondary color. Further, the Ain−Bin portion (in FIG. 15C, an outline portion) is added as it is. That is, there are obtained the following output signals:

$$Aout=(Ain-Bin)+(Bin-Cin) \times AB\_A+Cin \times ABC\_A,$$

$$Bout=(Bin-Cin) \times AB\_B+Cin \times ABC\_B,$$

$$Cout=Cin \times ABC\_C.$$

Figure 15D:
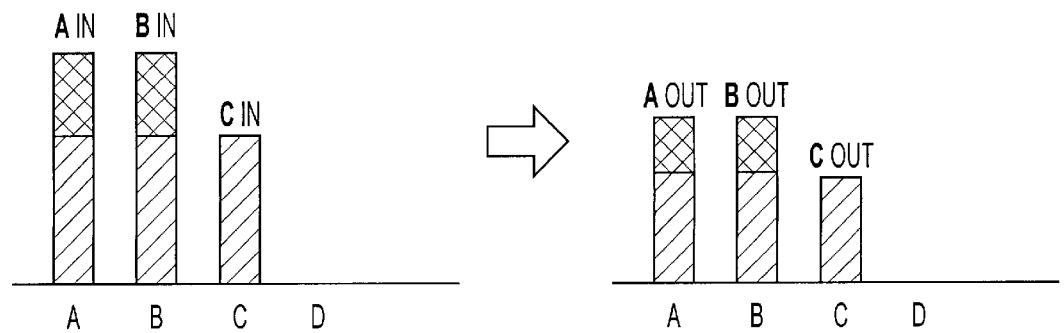

When Ain=Bin>Cin, as shown in FIG. 15D, up to the portions of Ain and Bin that are the same level to Cin are multiplied by the ink amount limiting coefficients of the cubic color. The Ain−Cin portion and the Bin−Cin portion are multiplied by the ink amount limiting coefficient of the secondary color. That is, there are obtained the following output signals:

$$Aout=(Ain-Cin) \times AB\_A+Cin \times ABC\_A,$$

$$Bout=(Bin-Cin) \times AB\_B+Cin \times ABC\_B,$$

$$Cout=Cin \times ABC\_C.$$

Here, when Ain>Bin>Cin, and Ain=Bin>Cin, there is also used the secondary color ink amount limiting coefficient AB__A=AB__B. It is also assumed that this ink amount limiting coefficient AB__A=AB__B is received from the ink amount limiting coefficient calculating portion 11. The ink amount limiting coefficient calculating portion 11, when the above-mentioned conditions are satisfied for the cubic color, calculates and outputs not only the cubic color ink amount limiting coefficient but also the secondary color ink amount limiting coefficient. Or, these secondary and cubic color ink amount limiting coefficients may also be output in response to a request from the print signal generating portion 12.

In particular, let us consider a case in which the image signals input are judged as a cubic color consisting of black, cyan and magenta. In FIGS. 15A to 15D, "A"→"K", "B"→"C", and "C"→"M" correspond to one another. When Kin=Cin=Min, as shown in FIG. 15A, the image signals are respectively converted to Kout=Kin×KCM__K, Cout=Cin× KCM__C, and Mout=Min×KCM__M and are then output as print signals. For example, when there are input the image signals that respectively correspond to d1=100, d2=100, and d3=100, since KCM__K=KCM C=KCM M=0.66 is obtained from FIG. 11, the image signals are respectively converted to 66=100×0.66, 66=100×0.66, and 66=100×0.66, before they are output as print signals.

Also, when Kin>Cin=Min, the image signals are respectively converted to Kout=(Kin−Cin)+Cin×KCM__K, Cout= Cin×KCM__C, and Mout=Min×KCM__M, and are then output as print signals. For example, when there are input the image signals that respectively correspond to d1=100, d2=65, and d3=65, since KCM__K=KCM__C=KCM__M= 0.66 is obtained, the image signals are respectively converted to 78=(100−65)+65×0.66, 43=65×0.66, and 43=65× 0.66, before they are output as print signals.

Further, when Kin>Cin>Min, the image signals are respectively converted to Kout=(Kin−Cin)+(Cin−Min)× KC__K+Min×KCM__K, Cout=(Cin−Min)×KC__C+Min× KCM__C, and Mout=Min×KCM__M. For example, when there are input the image signals that respectively correspond to d1=100, d2=65, and d3=50, since KCM__K= KCM__C=KCM__M=0.66 is obtained from FIG. 11 and also since KC__K=KC__C=0.83 is obtained from FIG. 10, the image signals are respectively converted to 80=(100−65)+ (65−50)×0.83+50×0.66, 45=(65−50)×0.83+50×0.66, and 33=50×0.66, before they are output as print signals.

Still further, when Kin=Cin>Min, the image signals are respectively converted to Kout=(Kin−Min)×KC__K+Min× KCM__K, Cout=(Cin−Min)×KC__C+Min×KCM__C, and Mout=Min×KCM__M. For example, when there are input the image signals that respectively correspond to d1=100, d2=100, and d3=65, since KCM__K=KCM__C=KCM__M= 0.66 is obtained from FIG. 11 and also since KC__K=KC__ C=0.83 is obtained from FIG. 10, the image signals are respectively converted to 72=(100−65)×0.83+65×0.66, 72=

(100−65)×0.83+65×0.66, and 43=65×0.66, before they are output as print signals.

Although description has been given above of two sets of ink combination, that is, one ink combination for a secondary color and one ink combination for a cubic color, in other ink combinations as well as in a quartic color, the input signals may be converted in accordance with a similar concept to the above. In this manner, according to the second operation example, while holding ink amount differences between the respective colors as much as possible, the ink amount can be limited, which makes it possible to obtain an excellent image in which the blurred and back-surface-soaked ink is reduced.

Now, description will be given below of a third example of the operation of the first embodiment of an ink jet recording apparatus according to the invention. The present third operation example is different mainly in the operation of the ink amount limiting coefficient calculating portion 11 from the previously described first operation example. In the previously described first operation example, the ink amount limiting coefficient is calculated in such a manner that the addition value or sum of the maximum numbers of times of repeated printing is within the limited repeated printing conversion number regardless of the size of the image signal. However, when the image signal is small, even if it is printed as it is, in most cases, the addition value or sum of the maximum numbers of times of repeated printing does not reach the limited repeated printing conversion number. In such cases, if the signal is printed as it is, then a good density can be obtained and the quality of the formed image can also be improved. In the present or third operation example, when the image signal input is judged that it is a signal of one or more of secondary to quartic colors, if the addition value or sum of the maximum numbers of times of normally executed repeated printing is smaller than the limited repeated printing conversion number, then the ink amount is not limited; on the other hand, if it is larger than the limited repeated printing conversion number, then the ink amount for every color is limited so that the sum can provide the limited repeated printing conversion number. By the way, in the following description, only the portions of the third operation example that are different from the previously described first operation example will be explained.

Figure 16A:
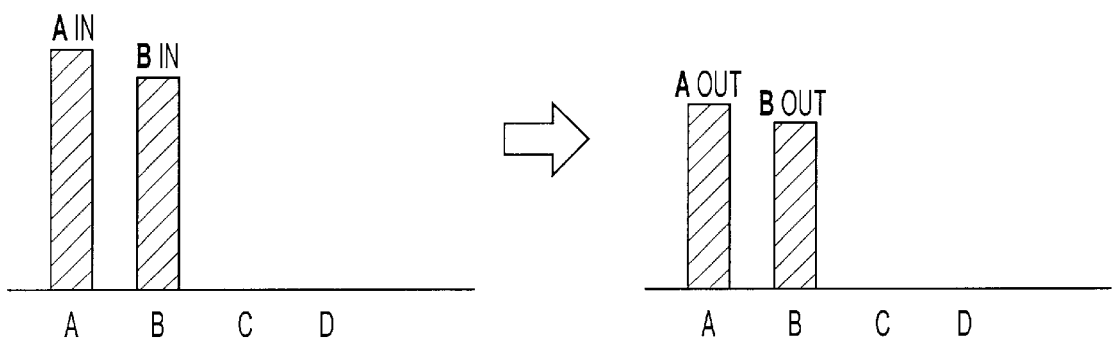
FIGS. 16A and 16B are explanatory view of an example of an operation to be executed for a secondary color by an ink amount limiting section in the third operation example of the above embodiment of an ink jet recording apparatus according to the invention.
Figure 16B:
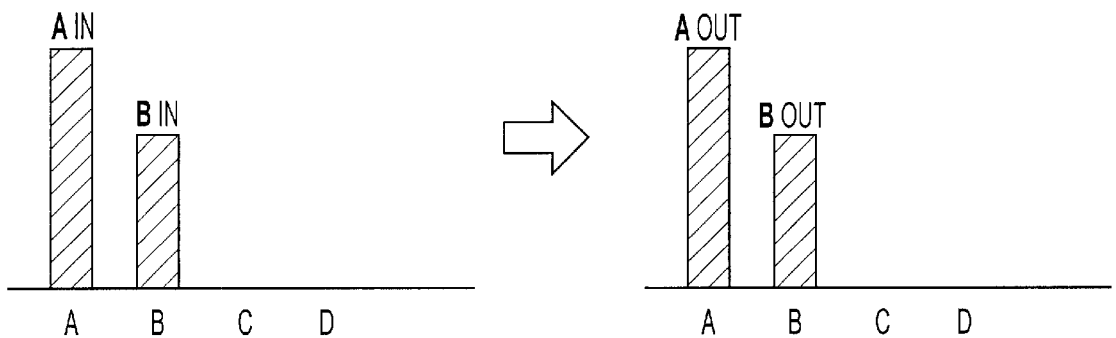
Figure 17A:
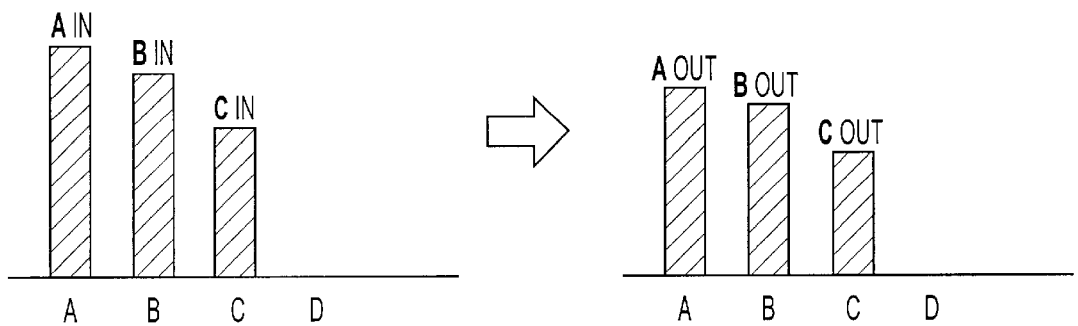
FIGS. 17A and 17B are explanatory view of an example of an operation to be executed for a cubic color by the ink amount limiting section in the third operation example of the above embodiment of an ink jet recording apparatus according to the invention.
Figure 17B:
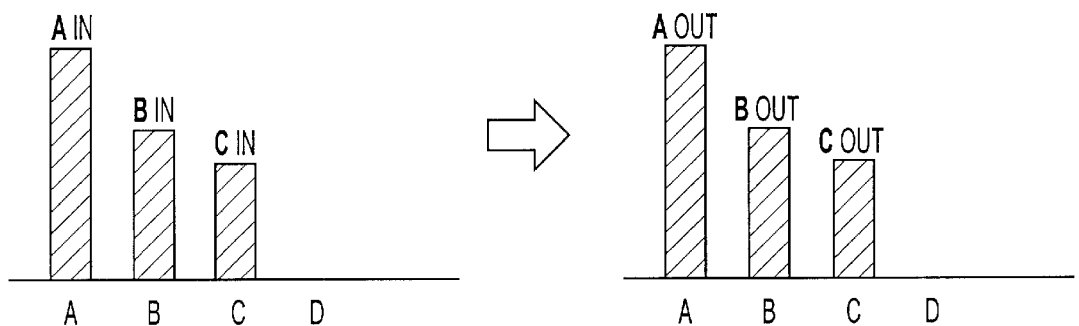

Now, FIGS. 16A to 17B are respectively explanatory views of an example of the operation of the ink amount limiting section in the third operation example of the above embodiment of an ink jet recording apparatus according to the invention. In particular, FIGS. 16A and 16B show secondary color case, whereas FIGS. 17A and 17B show a cubic color case. Here, let us consider a case in which an image signal input is a secondary color, and it is assumed that optical densities corresponding to the signals of the respective colors are d1 and d2. In this case, the repeated printing conversion numbers respectively provide $f_A(d1 \times AB\_A)$, and $f_B(d2 \times AB\_B)$. Here, a limited repeated printing conversion number obtained when the ink amount is limited is expressed as Ld. In particular, when $f_A(d1)+f_B(d2)>Ld$, the ink amount limiting coefficient calculating portion 11, similarly to the previously described first operation example, calculates ink amount limiting coefficients AB__A and AB__B which can provide $f_A(d1 \times AB\_A)+f_B(d2 \times AB\_B) \approx Ld$. Also, when $f_A(d1)+f_B(d2) \leq Ld$, the ink amount limiting coefficient calculating portion 11 sets the ink amount limiting coefficients for AB__A=AB__B=1.0.

After then, the thus calculated ink amount limiting coefficients are sent the ink amount limiting coefficient calculating portion 11 to the print signal generating portion 12. In the print signal generating portion 12, similarly to the previously described first operation example, the image signals are multiplied by the ink amount limiting coefficients. In this multiplication, when $f_A(d1)+f_B(d2)>Ld$, since there has been received an ink amount limiting value as the ink amount limiting coefficients AB__A, AB__B, the image signals are multiplied by the ink amount limiting value to thereby generate print signals in which the ink amounts thereof are limited in such a manner as shown in FIG. 16A. Also, when $f_A(d1)+f_B(d2) \leq Ld$, since there has been received a value AB__A=AB__B=1.0 as the ink amount limiting coefficient, even if the image signals are multiplied by the value, as shown in FIG. 16B, the image signals are left unchanged, so that there are generated print signals in which no ink limiting processing is executed.

In particular, when the image signals input are judged that they are a secondary color consisting of black and cyan, it is assumed that, in FIGS. 16A and 16B, "A"→"K" and "B"→"C" correspond to each other. And, as can be seen from FIG. 8, the then limited repeated printing conversion number is 3. For example, when a density 1 with respect to the input black signal is 100 (d1=100) and a density 2 with respect to the input cyan signal is 90 (d2=90), there is obtained $f_B(100)+f_C(90)=3.5>3$; and, therefore, the ink amount limiting coefficient calculating portion 11 calculates ink amount limiting coefficients KC__K and KC__C which can produce $f_B(100 \times KC\_K)+f_C(90 \times KC\_C) \approx 3$. In the calculation of these ink amount limiting coefficients KC__K and KC__C, as has been described in the previously described first operation example, when KC__K=KC__C, then there can be used the table of the repeated printing conversion numbers shown in FIG. 9. In this case, when KC__K=KC__C=0.90, then there are obtained $f_B(100 \times KC\_K)=f_B(90)=0.9$, and $f_C(90 \times KC\_C)=f_C(81)=2.05$, so that there is obtained $f_B(100 \times KC\_K)+f_C(90 \times KC\_C)=2.95 \approx 3$. The thus obtained ink amount limiting coefficient KC__K=KC__C=0.90 is sent to the print signal generating portion 12.

In response to this, the print signal generating portion 12 calculates Kout=Kin×KC__K, and Cout=Cin×KC__C. That is, in the print signal generating portion 12, the input image signals are converted to 90=100×0.90, and 81=90×0.90 and are then output as print signals, respectively.

Also, for example, when a density with respect to the black signal is 100 (d1=100) and a density with respect to the cyan signal is 65 (d2=65), there is obtained $f_B(100)+f_C(65)=1+1.5=2.5 \leq 3$. In this case, the ink amount limiting coefficient calculating portion 11 outputs an ink amount limiting coefficient KC__K=KC__C=1.0 to the print signal generating portion 12. In the print signal generating portion 12, the image signals are converted to 100=100×1.0 and 65=65×1.0, respectively. Substantially, the image signals are not converted; that is, while the ink amounts thereof are not limited, the image signals, as they are, are output as print signals.

The above-mentioned operation can apply similarly to a cubic color case. In particular, densities, which correspond to the three color image signals, are respectively expressed as d1, d2 and d3. In this case, the repeated printing conversion numbers provide $f_A(d1 \times ABC\_A)$, $f_B(d2 \times ABC\_B)$, $f_C(d3 \times ABC\_C)$, respectively. Here, it is assumed that a limited repeated printing conversion number when an ink amount is limited is expressed as Ld. In this case, when $f_A(d1)+f_B(d2)+f_C(d3)>Ld$, the ink amount limiting coefficient calculating portion 11, similarly to the previously described first operation example, calculates ink amount limiting coefficients ABC__A, ABC__B, and ABC__C which can provide $f_A(d1 \times ABC\_A)+f_B(d2 \times ABC\_B)+f_C(d3 \times$ ABC_C)≈Ld. Also, when $f_A(d1)+f_B(d2)+f_C(d3) \leq Ld$, then the ink amount limiting coefficients are set for ABC_A=ABC_B=ABC_C=1.0.

After then, the thus calculated ink amount limiting coefficients are sent to the print signal generating portion 12. In response to this, the print signal generating portion 12, similarly to the previously described first operation example, multiplies the image signals by the thus sent ink amount limiting coefficients. At the then time, when $f_A(d1)+f_B(d2)+f_C(d3)>Ld$, since there have been sent to the print signal generating portion 12 ink amount limiting values as the ink amount limiting coefficients ABC_A, ABC_B, and ABC_C, through the multiplication of these ink amount limiting coefficients ABC_A, ABC_B, and ABC_C and the image signals, as shown in FIG. 17A, there are generated print signals in which the ink amounts are limited. Also, when $f_A(d1)+f_B(d2)+f_C(d3) \leq Ld$, since there have been sent to the print signal generating portion 12 ink amount limiting values as the ink amount limiting coefficients ABC_A=ABC_B=ABC_C=1.0, even if the image signals are multiplied by such ink amount limiting coefficients ABC_A=ABC_B=ABC_C=1.0, as shown in FIG. 17B, the image signals are left unchanged, so that there are generated print signals in which the ink amounts are not limited.

In particular, when the image signals input are judged that they are a cubic color consisting of black, cyan and magenta, then it is assumed that, in FIGS. 17A and 17B, "A"→"K", "B"→"C", and "C"→"M", correspond to one another. And, as can be seen from FIG. 8, the then limited repeated printing conversion number is 3.75. For example, when a density corresponding to the black signal is 100 (d1=100), a density corresponding to the cyan signal is 90 (d2=90), and a density corresponding to the magenta signal is 65 (d3=65), then there is obtained $f_B(100)+f_C(90)+f_M(65)=1+2.5+1.5=5>3.75$. Therefore, the ink amount limiting coefficient calculating portion 11 calculates ink amount limiting coefficients KCM_K, KCM_C, and KCM_M which provide $f_B(100 \times KCM\_K)+f_C(90 \times KCM\_C)+f_M(65 \times KCM\_M) \approx 3.75$. In this case as well, there can be used the table of the repeated printing conversion numbers shown in FIG. 9. When the ink amount limiting coefficients are set as KCM_K=KCM_C=KCM_M=0.82, then there are obtained $f_B(100 \times KCM\_K)=f_B(82)=0.82$, $f_C(90 \times KCM\_C)=f_C(74)=1.8$, and $f_M(65 \times KCM\_M)=f_M(53)=1.1$, so that there is obtained $f_B(100 \times KCM\_K)+f_C(90 \times KCM\_C)+f_M(65 \times KCM\_M)=0.82+1.8+1.1=3.72 \approx 3.75$. And, the thus obtained ink amount limiting coefficients KCM_K=KCM_C=KCM_M=0.82 are then sent to the print signal generating portion 12.

On receiving these ink amount limiting coefficients, the print signal generating portion 12 calculates Kout=Kin×KCM_K, Cout=Cin×KCM_C, and Mout=Min×KCM_M. That is, the images signals are respectively converted to 82=100×0.82, 74=90×0.82, and 53=65×0.82, and, after then, they are output as print signals.

Also, for example, when a density corresponding to the black signal is 100 (d1=100), a density corresponding to the cyan signal is 65 (d2=65), and a density corresponding to the magenta signal is 50 (d3=50), then there are obtained $f_B(100)=1$, $f_C(65)=1.5$, and $f_M(50)=1$, so that $f_B(100)+f_C(65)+f_M(50)=1+1.5+1=3.5 \leq 3.75$. Therefore, the ink amount limiting coefficient calculating portion 11 sets the ink amount limiting coefficients for KCM_K=KCM_C=KCM_M=1.0 and outputs them to the print signal generating portion 12. In response to this, the print signal generating portion 12 outputs 100=100×1.0, 65=65×1.0, and 50=50×1.0 as print signals. That is, substantially, the ink amounts of the image signals are not limited but the image signals, as they are, are output as print signals.

Although description has been given heretofore of one set of color combination for the secondary color as well as one set of color combination for the cubic color, the present conversion concept can also apply to other cases. That is, in other sets of color combination and in a quartic color, image signals can be converted in accordance with the present conversion concept, before their respective print signals are generated. As described above, by limiting the ink amount only when the sum of the repeated printing conversion numbers exceeds the limited repeated printing conversion number, an image requiring a small number of times of repeated printing can be printed at its original density, so that a good quality image can be printed while preventing the density thereof from being lowered.

By the way, in the present third operation example as well, there can also be employed a structure in which, as in the previously described second operation example, the print signal generating portion 12 can multiply the image signals by the ink amount limiting coefficients every common portions thereof according to the sizes of the image signals.

Now, description will be given below of a fourth example of the operation of the first embodiment of an ink jet recording apparatus according to the invention. In the present fourth operation example, the ink amount limiting coefficients of the respective colors of input image signals are calculated in accordance with repeated printing conversion numbers which corresponding to the input image signals. That is, for the input image signal which requires a large repeated printing conversion number, the ink amount limiting coefficient decreases to thereby increase the ink amount to be reduced; on the other hand, for the input image signal which requires a small repeated printing conversion number, the ink amount limiting coefficient is set approximate to 1.00 to thereby not to reduce the ink amount so much. By the way, hereinafter, description will be given only of the portions of the fourth operation example that are different from the previously described first operation example.

Figure 18:
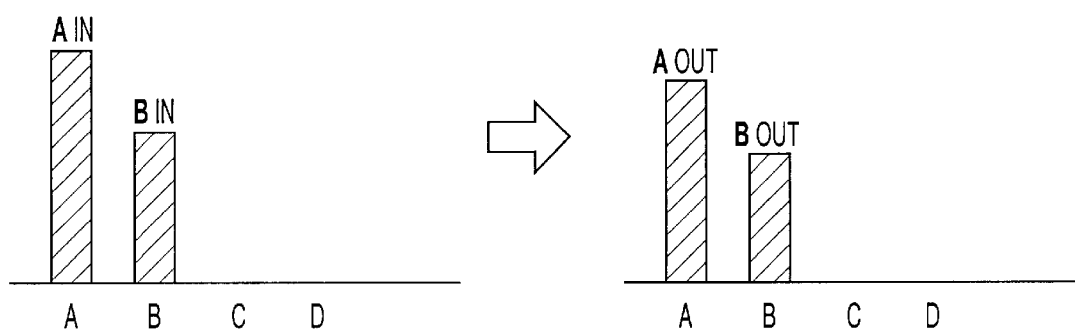
FIG. 18 is an explanatory views of an example of an operation to be executed for a secondary color by an ink amount limiting section in the fourth operation example of the above embodiment of an ink jet recording apparatus according to the invention; and, FIG. 19 is an explanatory views of an example of an operation to be executed for a cubic color by the ink amount limiting section in the fourth operation example of the above embodiment of an ink jet recording apparatus according to the invention.
Figure 19:
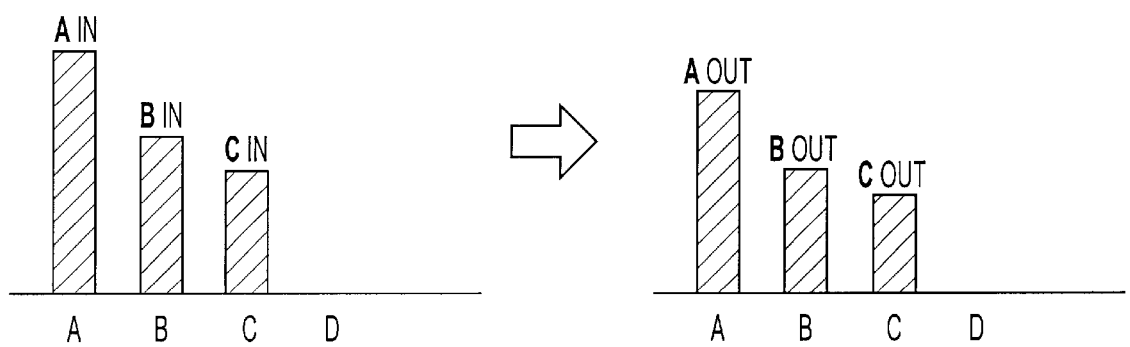

Now, FIGS. 18 and 19 are respectively explanatory views of an example of the operation of an ink amount limiting section in the fourth operation example of the above embodiment of an ink jet recording apparatus according to the invention. In particular, FIG. 18 shows a secondary color case, whereas FIG. 19 shows a cubic color case. Here, let us consider a case in which an image signal input is a secondary color, and it is assumed that densities corresponding to the signals of the respective colors are d1 and d2. In this case, the repeated printing conversion numbers respectively provide $f_A(d1 \times AB\_A)$, and $f_B(d2 \times AB\_B)$. Here, the sum of the maximum numbers of times of repeated printing is $f_A(100)+f_B(100)=Pd$ and, a limited repeated printing conversion number obtained when the ink amount is limited is expressed as Ld. Also, the sum of the numbers of times of repeated printing is $f_A(d1)+f_B(d2)=Dd$.

Now, let us consider a function g (Dd) which permits the relation that, when Dd=Pd, then g (Dd)=Ld and, when Dd=0, then g (Dd)=0. And, in the ink amount limiting coefficient calculating portion 11, there are obtained such ink amount limiting coefficients AB_A and AB_B that can provide $f_A(d1 \times AB\_A)+f_B(d2 \times AB\_B) \approx g$ (Dd). In the print signal generating portion 12, the image signals are multiplied by the ink amount limiting coefficients AB_A and AB_B obtained in the ink amount limiting coefficient calculating portion 11, thereby generating print signals.

The function g (Dd) may simply be set such that g (Dd)=Dd×Ld/Pd. Here, however, the function g (Dd) is assumed that, it is weighted according to the value of Dd, when Dd is small, the variation amount thereof can be made as small as possible, and, as Dd approaches Pd, the variation amount thereof can be made to increase. Here, as an example, there is used g (Dd)=Dd×(Ld/Pd+(1−Ld/Pd)×(1−Dd/Pd).

In particular, it is assumed that image signals input are a secondary color consisting of black and cyan. In FIG. 18, it is assumed that "A"→"K" and "B"→"C" correspond to each other. According to FIG. 8, the sum of the maximum numbers of times of repeated printing and the limited repeated printing conversion number are 4 and 3, respectively. Assuming that the densities of black and cyan corresponding to their respective image signals are expressed as d1 and d2, the ink amount limiting coefficient calculating portion 11, using the then repeated printing conversion numbers $f_B$(d1×KC__K) and $f_C$(d2×KC__C), calculates ink amount limiting coefficients KC__K and KC__C which can provide $f_B$(d1×KC__K)+$f_C$(d2×KC__C)≈Dd×(3/4+(13/4)×(1−Dd/4).

For example, when the density d1 corresponding to the black signal input is 100 (d1=100) and the density d2 corresponding to the cyan signal input is 65 (d2=65), since $f_B$(100)+$f_C$(65)=1+1.5=2.5 is obtained according to FIG. 9, the ink amount limiting coefficient calculating portion 11 calculates the ink amount limiting coefficients KC__K and KC__C which can provide $f_B$(100×KC__K)+$f_C$(65×KC__C) ≈2.5×(3/4+(1−3/4)×(1−2.5/4)=2.1. In this case, when KC__K=KC__C=0.87, there are obtained $f_B$(100×KC__K)= $f_B$(87)=0.87 and $f_C$(65×KC__C)=$f_C$(57)=1.23 from the table of the repeated printing conversion numbers shown in FIG. 9; and, therefore, there is obtained $f_B$(100×KC__K)+$f_C$(65× KC__C)=0.87+1.23=2.1, which coincides with the value of the function g (Dd). The ink amount limiting coefficient calculating portion 11 sends the thus obtained ink amount limiting coefficients KC__K=KC__C=0.87 to the print signal generating portion 12. In response to this, the print signal generating portion 12 multiplies the image signals by these ink amount limiting coefficients KC__K=KC__C=0.87 to thereby converts the image signals to 87=100×0.87 and 57=65×0.87 respectively and, after then, outputs them as print signals.

The above-mentioned operation can similarly apply to a case in which the image signals input are a cubic color. In particular, it is assumed that densities respectively corresponding to the respective color signals are respectively expressed as d1, d2 and d3. At the then time, the repeated printing conversion numbers are $f_A$(d1×ABC__A), $f_B$(d2× ABC__B), and $f_C$(d3×ABC__C), respectively. Here, it is assumed that the sum of the maximum numbers of times of repeated printing is $f_A$(100)+$f_B$(100)+$f_C$(100)=Pd, and the limited repeated printing conversion number when the ink amount is limited is Ld. Also, it is also assumed that the sum of the numbers of times of the repeated printing is $f_A$(d1)+$f_B$(d2)+$f_C$(d3)=Dd. Here, similarly to the secondary color case, let us consider a function g (Dd); and, in the ink amount limiting coefficient calculating portion 11, there are obtained ink amount limiting coefficients ABC__A, ABC__B, and ABC__C which can provide $f_A$(d1×ABC__A)+$f_B$(d2× ABC__B)+$f_C$(d3×ABC__C)≈g (Dd). The thus obtained ink amount limiting coefficients ABC__A, ABC__B, and ABC__C are then sent from the ink amount limiting coefficient calculating portion 11 to the print signal generating portion 12. In the print signal generating portion 12, the image signals input are respectively multiplied by the ink amount limiting coefficients ABC__A, ABC__B, and ABC__C, thereby generating print signals.

In particular, it is assumed that the image signals input are a cubic color consisting of black, cyan and magenta. It is also assumed that, in FIG. 19, "A"→"K", "B"→"C" and "C"→"M" correspond to one another. In this case, the addition value or sum of the maximum numbers of times of repeated printing and the limited repeated printing conversion number are respectively 7 and 3.5 according to FIG. 8. Assuming that the densities of black, cyan, and magenta respectively corresponding to their respective image signals are expressed as d1, d2 and d3, the ink amount limiting coefficient calculating portion 11, using the then $f_B$(d1× KCM__K), $f_C$(d2×KCM__C), and $f_M$(d3×KCM__M), calculates ink amount limiting coefficients KCM__K, KCM__C, and KCM__M which can provide $f_B$(d1×KCM__K)+$f_C$(d2× KCM__C)+$f_M$ (d3×KCM__M)≈Dd×(3.75/7+(1−3.75/7)×(1−Dd/7)).

For example, when the density of black corresponding to its associated black signal input is 100 (d1=100), the density of cyan corresponding to its associated cyan signal input is 65 (d2=65), and the density of magenta corresponding to its associated magenta signal input is 50 (d3=50), there is obtained $f_B$(100)+$f_C$(65)+$f_M$(50)=1+1.5+1=3.5 according to FIG. 9; and, therefore, in the ink amount limiting coefficient calculating portion 11, there are calculated ink amount limiting coefficients KCM__K, KCM__C, and KCM__M which can provide $f_B$(100×KCM__K)+$f_C$(65×KCM__C)+$f_M$ (50×KCM__M)≈3.5×(3.75/7+(1−3.75/7)×(1−3.5/7))=2.8. In this case, when KCM__K=KCM__C=KCM__M=0.80, there are obtained $f_B$(100×KCM__K)=$f_B$(80)=0.8, $f_C$(65×KCM C)=$f_C$(52)=1.07, and $f_M$(50×KCM__M)=$f_M$(40)=0.8 according to the table of the repeated printing conversion numbers shown in FIG. 9; and, therefore, there is obtained $f_B$(100× KCM__K)+$f_C$(65×KCM__C)+$f_M$(50×KCM__M)=0.8+1.07+ 0.8=2.67≈2.8. And, the ink amount limiting coefficient calculating portion 11 sends the thus obtained ink amount limiting coefficients KCM__K=KCM__C=KCM__M=0.80 to the print signal generating portion 12. In the print signal generating portion 12, the image signals are multiplied by the ink amount limiting coefficients KCM__K=KCM__C= KCM__M=0.80 and are thereby converted to 80=100×0.80, 52=65×0.80, and 40=50×0.80. After then, the print signal generating portion 12 outputs them as print signals.

Although description has been given heretofore of one set of color combination for the secondary color as well as one set of color combination for the cubic color, the present conversion concept can also apply to other cases. That is, in other sets of color combination and in a quartic color, image signals can be converted in accordance with the present conversion concept, before their respective print signals are generated. As described above, according to the present operation example, since the repeated printing conversion numbers of the input image signals are weighted to thereby obtain the limited repeated printing conversion numbers and the ink amounts of the respective colors are limited so that they can correspond to the thus obtained, limited repeated printing conversion numbers, not only the light portion of the image can be printed substantially at its original density and the dense portion thereof can be printed with the number of times of repeated printing thereof reduced, but also, even in the intermediate density thereof, the continuous gradation can be obtained. This makes it possible to provide a good image quality while preventing the ink from being blurred or being soaked up to the back surface of the record medium.

In the above four operation examples, description has been given of the cases in which the ink amounts are limited in the secondary to quartic colors in such a manner that black and yellow are not printed repeatedly but only cyan and magenta are printed repeatedly three times to thereby express the maximum density. However, the invention is not limited to this but, for example, the maximum number of times of the repeated printing of the respective colors may be set for one or more arbitrary numbers, including a case in which black, cyan, magenta and yellow are all printed once to thereby express the maximum density but they are not printed repeatedly. Also, in the above operation examples, for the primary color, the ink amount is not limited. However, this is not limitative but, even for the primary color, the ink amount thereof can also be limited. Further, as in the above examples, there can be employed a structure in which the ink amount limiting processing by the ink amount limiting section 4 can be turned on or off according to the kinds of modes. However, it is also possible to employ another structure in which the limited repeated conversion numbers can be changed according to the modes or record mediums to be printed thereon.

As can be seen clearly from the foregoing description, according to the invention, when the high-density portions of the image and a plurality of color inks are printed repeatedly a large number of times, there is obtained the limited repeated printing conversion number equal to or less than the number of times of repeated printing that prevents the ink from being blurred or from soaking to the back surface of the record medium, the ink amounts of the respective colors are limited in such a manner that the ink amounts can satisfy the thus obtained limited repeated printing conversion number, and print signals are generated with the ink amounts limited, before the whole image is printed. Due to this, there can be effectively reduced the possibility that the ink can be blurred or can soak up to the back surface of the record medium.

What is claimed is:

1. An ink jet recording apparatus for recording a color image while expressing gradations by generating a print signal in such a manner that two or more color inks, each color ink having an optical density, the optical density of at least one color ink being different from the optical density of at least one other color ink, are dot printed repeatedly at a unit pixel of a record medium according to an image signal input, said ink jet recording apparatus comprising:

ink amount limiting coefficient determining means for distinguishing colors used in said image signal and also for determining ink amount limiting coefficients used to limit ink amounts for said respective colors used, so that a sum of an actual numbers of times of repeated printing for each of said colors used is equal to or less than a given value, wherein, for each color ink, a maximum number of times of repeated printing is based on the optical density of that color ink and provides a limited repeated printing conversion number, and print signal generating means for generating a print signal based on said image signal and said ink amount limiting coefficients.

2. The ink jet recording apparatus of claim 1, wherein said print signal generating means selectively operates according to printing modes.

3. The ink jet recording apparatus of claim 1, further comprising:

halftoning means for processing the print signal in a quantized manner having halftone.

4. The ink jet recording apparatus of claim 1, further comprising:

color adjusting means for adjusting the colors of said input image signal before said image signal is output, wherein, said color adjusting means adjusts previously variations in the colors due to processing executed by said print signal generating means.

5. The ink jet recording apparatus of claim 1, wherein said print signal generating means multiplies the respective color components of said image signal by said ink amount limiting coefficients determined for each respective color so as to convert the image signal to the print signal.

6. The ink jet recording apparatus of claim 1, wherein said print signal generating means converts the image signal to the print signal in such a manner that portions of the color components of the image signal common to two or more of the color components of the image signal are multiplied by the ink amount limiting coefficient corresponding to their respective common portions, and the excess portions thereof, that is those portions not in common, are added to provide a print signal.

7. The ink jet recording apparatus of claim 1, wherein, if a sum of the numbers of times of repeated printing for each color used, when the image signal is printed, is equal to or less than the limited repeated printing conversion number, said ink amount limiting coefficient determining means sets the ink amount limiting coefficient to a value that has no influence on said print signal generating means.

8. The ink jet recording apparatus of claim 1, wherein, in order that a sum of the maximum numbers of times of repeated printing can provide said limited repeated printing conversion number, said ink amount limiting coefficient determining means weights a sum of the numbers of times of repeated printing by colors, when the image signal is printed in accordance with the image signal, and also determines said ink amount limiting coefficient that provides the weighted sum of the numbers of times of repeated printing.

9. A color image forming method for forming a color image expressing gradations by printing repeatedly ink dots at a unit pixel of a record medium of two or more color inks, each color ink having an optical density, the optical density of at least one color ink being different from the optical density of at least one other color ink, according to an input image data, said method comprising:

processing the input image data in such a manner that a number of times of repeated ink dot printing at the unit pixel satisfies the following relation, a maximum value of the number of times of repeated ink dot printing for each color ink of an $N \geq 2$-dimension color, based on the optical density of that color ink, is less than or equal to a sum of maximum values of a numbers of times of repeated ink dot printing for each primary color used, where the $N \geq 2$-dimension color is a set of color combinations comprising $N \geq 2$ colors and a primary color corresponds to a single color ink.

10. The color image forming method of claim 9, wherein color inks of higher optical density are used for Y (yellow) and K (black), than are used for color inks of C (cyan) and M (magenta).

11. The color image forming method of claim 10, wherein the maximum value of the number of times of repeated ink dot printing at the same unit pixel in a primary color ink of Y and a primary color ink of K is 1, and the maximum value of the number of times of repeated ink dot printing at the same unit pixel in a primary color ink of C and a primary color ink of M is 3.

* * * * *